June 6, 1933.　　　　F. L. CONE　　　　1,912,622

MACHINE TOOL WITH CHIP REMOVING MEANS

Filed Oct. 6, 1931　　　3 Sheets-Sheet 1

Inventor:
Frank L. Cone.
by
Wright Brown Quinby & May
Attys.

June 6, 1933.    F. L. CONE    1,912,622
MACHINE TOOL WITH CHIP REMOVING MEANS
Filed Oct. 6, 1931    3 Sheets-Sheet 2

Inventor:
Frank L. Cone.
by Wright Brown Quinby May
Attys.

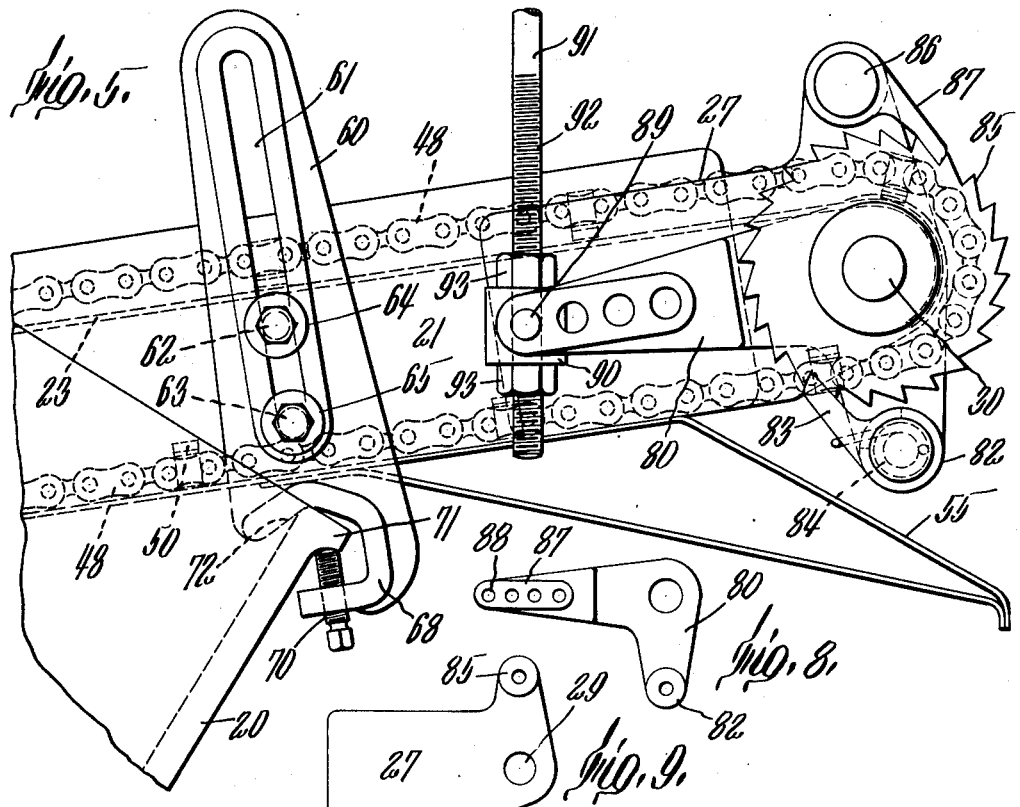
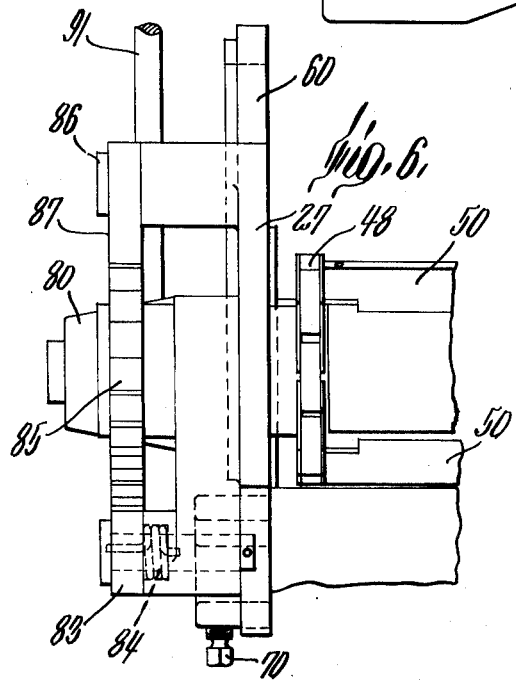
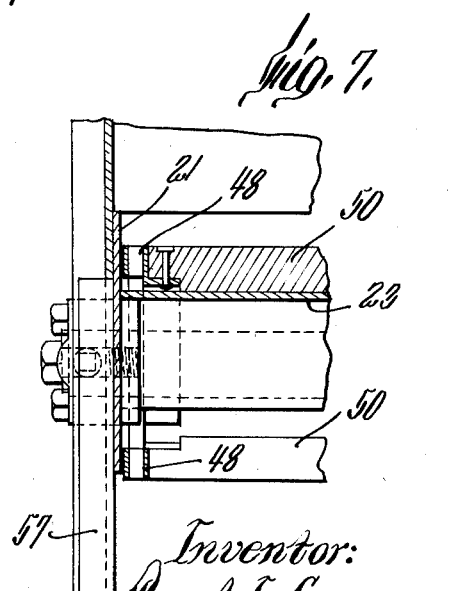

Patented June 6, 1933

1,912,622

UNITED STATES PATENT OFFICE

FRANK L. CONE, OF WINDSOR, VERMONT

MACHINE TOOL WITH CHIP-REMOVING MEANS

Application filed October 6, 1931. Serial No. 567,159.

Machine tools, particularly those which employ a considerable number of tools operating substantially simultaneously, such, for example, as multiple spindle automatic lathes and screw machines, produce chips rapidly and in large volume and where these chips are allowed to accumulate at the base of the machine, as is common practice, they must be removed frequently. It is difficult to remove the chips, however, due to their weight and their tendency to become entangled and the necessarily rather restricted opening in the machine through which they must be taken out.

One of the objects of this invention is to provide automatic power driven means for removing the chips. The chips are commonly removed from the back of the machine so that sufficient room must be left for access thereto. In machines of the automatic lathe or screw machine type, however, which work upon bar stock, room at the headstock end of the machine for the support of the stock which is being fed to the tool must be provided and in accordance with this invention this room beneath the stock may be utilized for the placing of portable receptacles into which the chips are delivered by the chip-removing means which delivers endwise of the machine from beneath the headstock. With this arrangement it is unnecessary to have free access to the back of the machine to remove the chips as heretofore so that it is often possible to place the machines closer together than in the usual practice. It is possible also when the chip remover is applied to a machine having a longitudinally extending cam shaft for controlling certain of the mechanisms, to actuate the chip remover from this shaft.

For a more complete understanding of this invention, reference may be had to the accompanying drawings in which Figure 1 is a fragmentary elevation of an automatic multiple spindle lathe showing the chip remover in position.

Figure 5 is a fragmentary elevation of the outer end of the chip remover as applied to the machine.

Figure 6 is a fragmentary outer end elevation of the chip remover.

Figure 7 is a detail section to a larger scale on line 7—7 of Figure 2.

Figures 8 and 9 are side elevations of certain detail parts.

Figure 1:
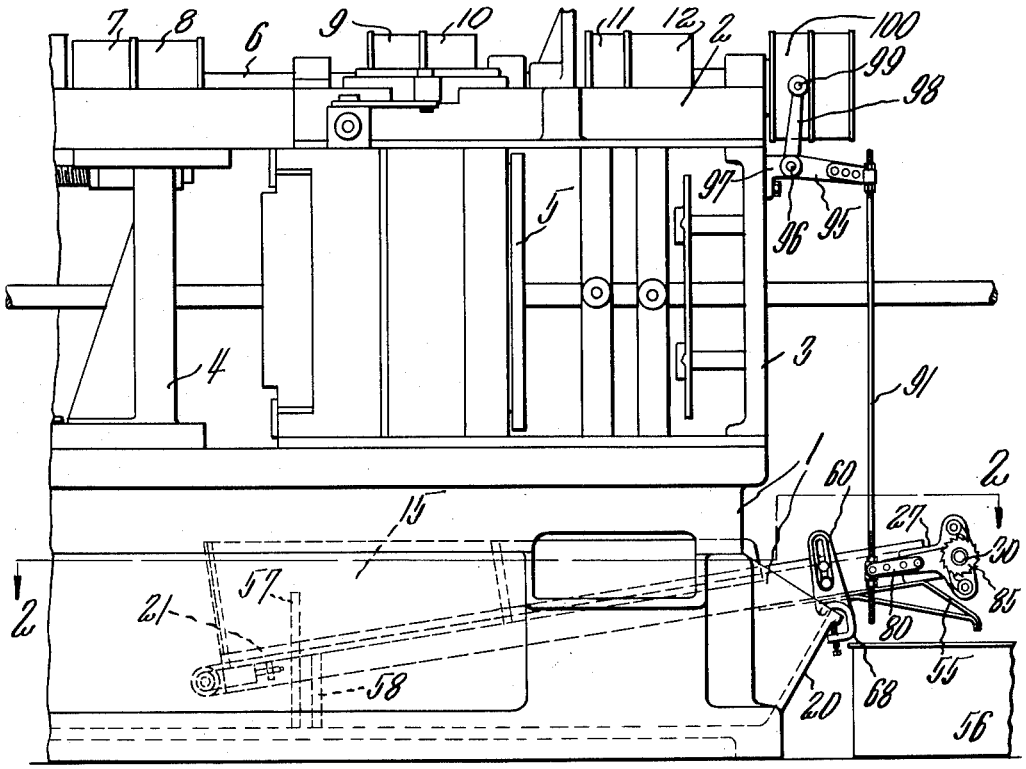
Figure 2:
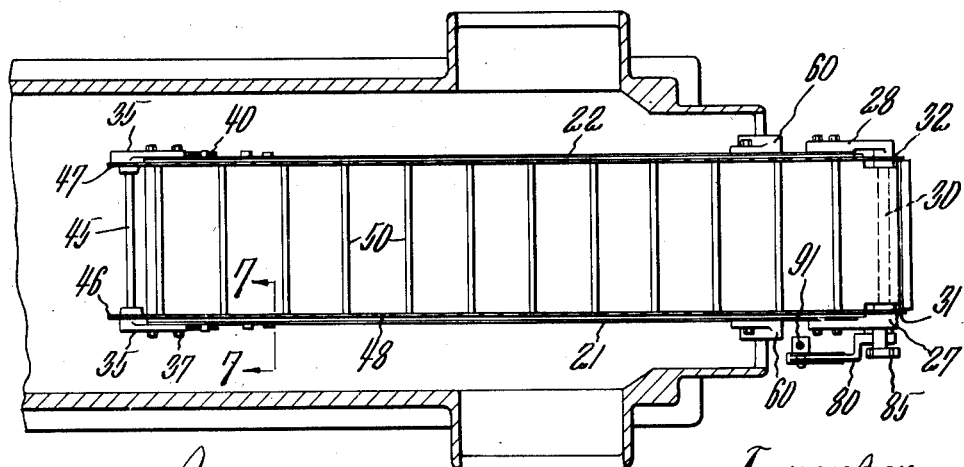
Figure 2 is a horizontal section on line 2—2 of Figure 1.
Figure 3:
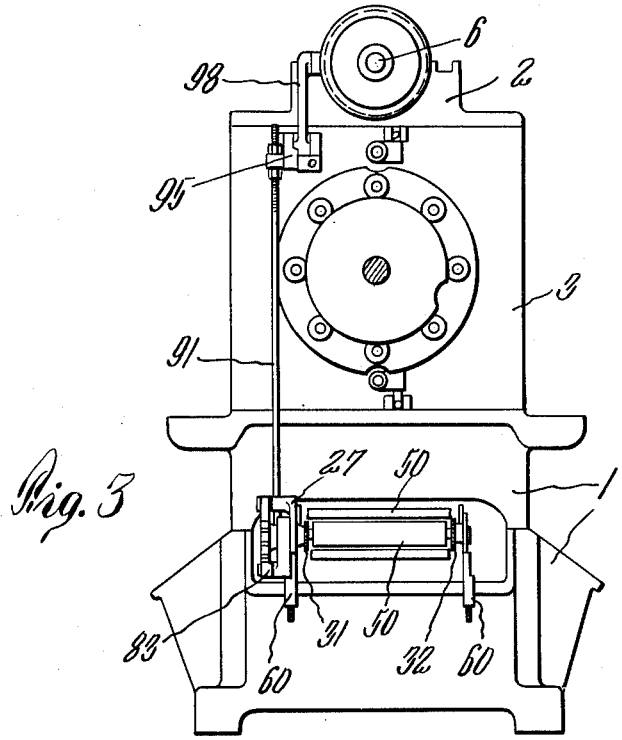
Figure 3 is an end elevation of the same.
Figure 4:
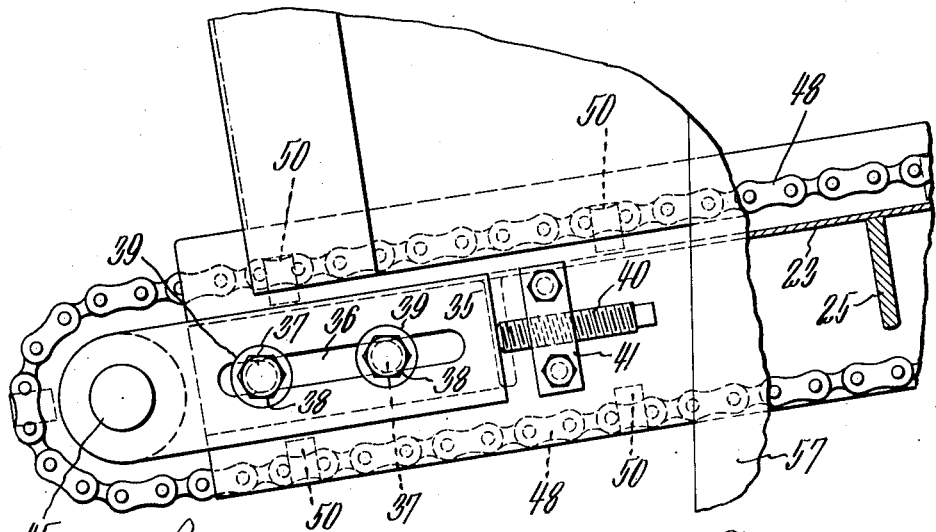
Figure 4 is a fragmentary view partly broken away and in section of the inner end of the chip remover.

In Figures 1, 2 and 3 of the drawings is illustrated somewhat diagrammatically an automatic lathe or screw machine, which, as shown, is of the general type illustrated in my Patent No. 1,271,540 though it will be understood that this invention in many respects is not limited to any particular type of machine. This machine as shown comprises a lower bed and base 1 and an upper bed 2 supported above the lower bed by upright frame members 3 and 4. Between these frame members is positioned a horizontal turret or drum 5 for supporting the work as is more clearly disclosed in my patent hereinbefore mentioned, the drum being provided with a plurality of rotary work spindles and being indexed to bring each spindle in turn into a definite angular position so that work carried thereby may be operated upon by suitable tools (not shown). This turret carrying the work may properly be referred to as the headstock portion of the machine and in machines of this type a space beyond this headstock end must be provided to hold a stock reel (not shown) by which the pieces of bar stock are supported as they are being operated upon in the machine and from which they are fed forward from time to time as the operations progress. Likewise the machine of this patent is provided with an overhead shaft 6 which is provided with suitable cam drums such as 7 to 12 for supporting cams for controlling various devices for carrying the tools for operating on the work, for indexing the drum and for various other controls as may be found necessary or desirable. The machine shown in my patent hereinbefore mentioned contains four work holding spindles but more or less may be employed as desired, the machine herein illustrated being provided with eight spindles instead of four as shown in my application Serial No. 547,544 filed June 29, 1931.

In the base portion of the machine there is provided a chip space 15 for receiving the chips cut from the work by the various tools, this space being just inwardly of the inner end of the drum 5. This chip space is formed as a receptacle having an outwardly and upwardly inclined end wall 20 at the headstock end of the machine and to this wall may be secured the mechanism for removing the chips from the chip space. This mechanism comprises a chip conveyor indicated generally at 21, the forward end of which extends downwardly lengthwise of the machine into the chip space to receive the chips directly from the tools and work thereabove. This conveyor may comprise a chute having opposite side walls 21 and 22 bridged across above their lower end by a bottom wall member 23. This member 23 may be supported on any suitable cross-beams 25 from the side walls 21 and 22.

At the outer end of the conveyor chute the side wall members have secured thereto brackets 27 and 28, the brackets 27 being shown detached in Figure 9. Each of these brackets is provided with a journal opening 29 within which is journaled a shaft 30. Inwardly of the side wall members 21 and 22 this shaft 30 has fixed thereto a pair of spaced sprocket wheels 31 and 32. The opposite or inner lower ends of the side wall members 21 and 22 have adjustably secured thereto brackets 35, each of these brackets being provided with a longitudinal slot 36 through which pass bolts 37 secured to the side walls 21 and 22. Beneath the heads 38 of these bolts are bearing washers 39 which bridge over the slot 36. Engaging the rear ends of the brackets 35 are adjusting screws 40 threaded through brackets 41 secured to the outer faces of the wall members 21 and 22. By this construction the members 35 may be individually adjusted lengthwise of the chute. At their outer ends these members 35 are provided with bearings for rotatably receiving the transverse shaft 45 on which are carried sprocket wheels 46 and 47 spaced similarly to the sprocket wheels 31 and 32 on the shaft 30, and extending about these sprocket wheels 31, 46 and 32, 47 are the endless chains 48. The upper stretches of each of these chains pass above the bottom wall member 23 while the lower stretches of these chains pass beneath this member. These chains are connected together at suitable intervals by the conveyor bars 50, those of the upper stretch substantially resting on the upper face of the bottom wall member 23 so that as the shaft 30 is rotated in the proper direction, these bars are moved upwardly over the face of this bottom wall member to carry chips falling on the chute at its inner lower end upwardly and outwardly, discharging them from the upper end of the bottom member 23 onto an inclined chute 55 from which they may fall into a suitable portable receptacle such as 56 shown in Figure 1. The inner lower end of the conveyor chute may be provided with supporting legs 57 and 58 which rest on the bottom wall of the chip receptacle of the machine. Where this conveyor passes over the end wall member 20 it may be provided on opposite sides with clamping dogs 60. As shown best in Figure 5 each of these may be provided with a longitudinal slot 61 through which may be passed bolts 62 and 63 threaded into the side wall members 21 and 22 of the conveyor, the heads of these bolts bearing on washers 64 and 65, so that the dogs 60 may be secured in any desired position of vertical adjustment with respect to the conveyor to hold its outer end at any desired elevation within the range of the slots 61. The lower end of each dog is provided with a jaw portion 68 through which may be passed a screw 70 which may be engaged with the under face of a lip 71 at the upper edge of the wall member 20 to secure the dog firmly to the upper edge of the wall member 20, its top edge engaging the angular face 72 of the dog within its jaw portion.

For actuating the conveyor the shaft 30 is shown as having journaled thereon at one end a bell crank lever 80 shown detached in Figure 8. One arm of this lever is shown as provided with a perforated boss 82 to which is pivotally secured a ratchet dog 83. A spring 84 engaging this dog 83 tends to hold it into engagement with a ratchet wheel 85 secured to the outer end of the shaft 30. The stationary bracket 27 is provided at its upper end with an outwardly extending perforated boss 85 for the reception of a pin 86 on which is pivotally secured a holding pawl 87 which also engages with the ratchet teeth of the ratchet wheel 85. Thus by rocking the bell crank lever 80 a step by step rotary motion may be imparted to the shaft 30 thus to intermittently move the conveyor chains in a direction to pull the chips caught by the cross bars 50 out from the chips, space and discharge them into the portable receptacle 56. As shown the bell crank lever 80 is provided with a perforated arm portion 88 within any of the holes of which may be placed a pin 89 secured to a block 90 axially adjustable on the lower end of an actuating rod 91. This rod 91 is shown as threaded at 92 for the reception of adjusting and securing nuts 93 by which the position of the block 90 may be determined. The upper end of the rod 91 is shown as adjustably secured to an arm 95 pivoted at 96 to a bracket 97 secured to the frame member 3 and rockable therewith is an arm 98 having a cam follower 99 at its upper end. This cam follower is in position to be actuated at suitable times by cams (not shown) fixed to a cam drum 100 secured to the outer end of the cam shaft 6. Thus as the cam shaft is revolved in the normal operation of the machine, the conveyor is actuated intermittently to remove the chips from the chip space within the frame of the machine and beneath the tools and work holding mechanism, the chips being moved lengthwise of the machine beneath the headstock and discharged into the portable receptacle 56 at the headstock end of the machine where a space must be left to receive the stock which is fed into the machine.

The cutting liquid such as oil or other coolant which is supplied to the cutting edges of the tools drains down the bottom wall member 23 of the conveyor chute so that the chips when they are removed are substantially free from such material which is thus saved for re-use, the intermittent actuation of the conveyor facilitating draining of the coolant from chips. By removing the chips lengthwise of the machine in this manner, it is unnecessary to have as free access to the back of the machine as might otherwise be necessary where the chips are removed as in usual practice by hand, so that not only is the space about the sides of the machine unencumbered by the chip receptacles but in many cases the machines may be set closer together without interference with the duties of the operator.

From the foregoing description of an embodiment of this invention it should be evident to those skilled in the art that various changes and modifications might be made without departing from the spirit or scope of this invention as defined by the appended claim.

I claim:

The combination with a machine tool having a chip receptacle comprising an end wall, a chute having side and bottom walls extending over said end wall into said receptacle, a shaft extending through said chute side walls outwardly of said chip receptacle, spaced sprocket wheels carried by said shaft, sprocket wheels at the inner end of said chute, endless sprocket chains passed about said shaft and inner sprocket wheels, the stretches of each chain passing above and below said bottom wall, conveyor bars joining said chains at intervals, said bars connecting the upper stretches of said chains being movable along said bottom wall as said sprocket wheels are turned, and means for rotating said shaft.

In testimony whereof I have affixed my signature.

FRANK L. CONE.